US005095446A

United States Patent [19]

Jingu

[11] Patent Number: 5,095,446

[45] Date of Patent: Mar. 10, 1992

[54] CIRCUIT FOR AND METHOD OF CONTROLLING OUTPUT BUFFER MEMORY

[75] Inventor: Kunio Jingu, Hitachi, Japan

[73] Assignee: Hitachi, Ltd., Tokyo, Japan

[21] Appl. No.: 166,987

[22] Filed: Mar. 11, 1988

[30] Foreign Application Priority Data

Mar. 14, 1987 [JP] Japan .............................. 62-59738

[51] Int. Cl.[5] ............................................ G06F 12/02

[52] U.S. Cl. .................................. 395/165; 340/799; 365/238; 395/166

[58] Field of Search ............... 364/518, 521; 340/724, 340/792, 798-801, 727; 382/46; 365/230.03, 230.06, 238

[56] References Cited

U.S. PATENT DOCUMENTS 4,197,590 4/1980 Sukonick et al. .................. 364/900
4,197,590 4/1980 Sukonick et al. .
4,602,251 7/1986 Sawada et al. ................ 340/750 X
4,603,348 7/1986 Yamada et al. .................. 382/44 X
4,667,308 5/1987 Hayes et al. .............. 365/230.02 X
4,700,320 10/1987 Kapur ............................... 364/521
4,716,533 12/1987 Ohmori .......................... 364/521 X
4,779,223 10/1988 Asai et al. ....................... 340/792 X
4,808,986 2/1989 Mansfield et al. ............. 340/798 X
4,835,532 5/1989 Fant ............................... 340/747 X

*Primary Examiner*—David L. Clark
*Attorney, Agent, or Firm*—Antonelli, Terry Stout & Kraus

[57] ABSTRACT

Data to be sent to a frame buffer memory keeping output data in a bit map form is subdivided into square blocks. The words arranged in the row direction are rotated in a column direction by a bit each time the row address is increased. The rotation amount is attained by adding the row and column addresses associated with the square block.

8 Claims, 11 Drawing Sheets

FIG. 2
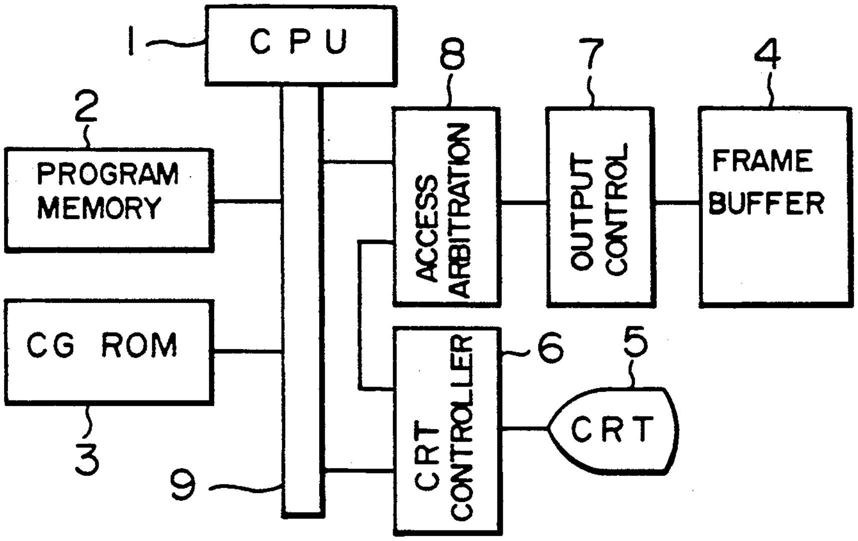
FIG. 3
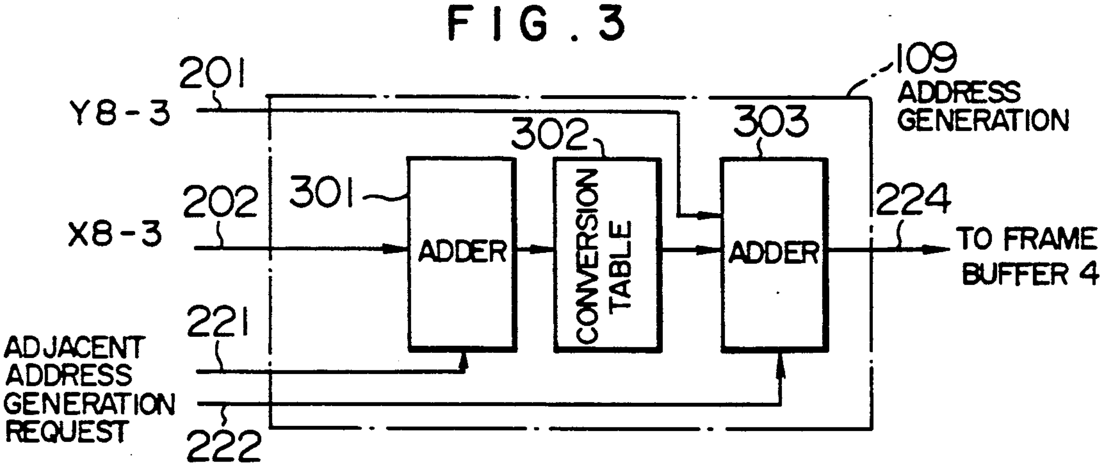
FIG. 4
302
| INPUT | OUTPUT |
|---|---|
| 0 | 0 |
| 1 | 25 |
| 2 | 50 |
| 36 | 900 |
| 37 | 925 |

FIG. 7
ADDRESS CONVERSION (110)
| ACCESS DIRECTION CHANGE-OVER SIGNAL | SUPPLY ADDRESS | CONVERSION ADDRESS | | | | | | | | |
|---|---|---|---|---|---|---|---|---|---|---|
| | | A | B | C | D | E | F | G | H | |
| X-AXIS DIRECTION | m=Y2,Y1,Y0 | m | m | m | m | m | m | m | m | m=2 |
| Y-AXIS DIRECTION | n=$\overline{X2}$,$\overline{X1}$,$\overline{X0}$ | n+1* | n+2* | n+3* | n+4* | n+5* | n+6* | n+7* | n* | |
* FOR ADDITION RESULT ≧8, 8 IS TO BE SUBTRACTED FROM THE VALUE ABOVE
FIG. 8
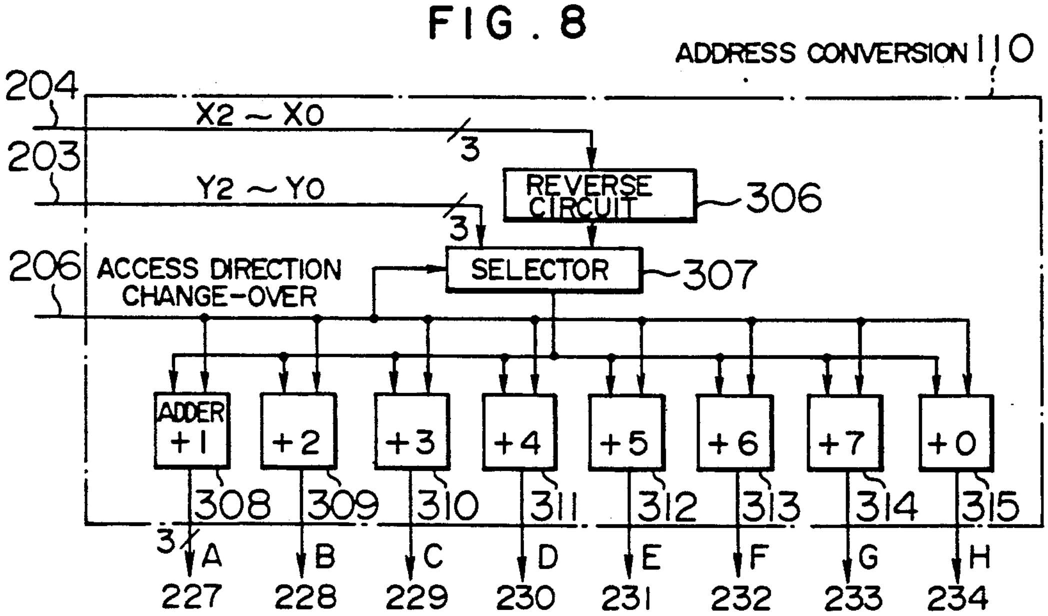
FIG. 9
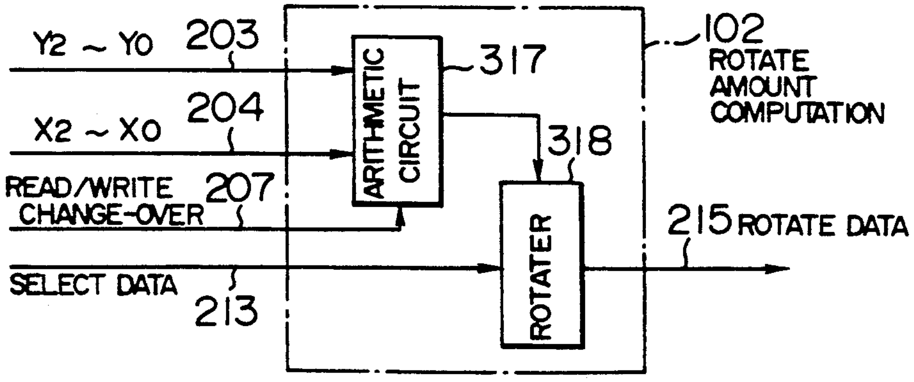

ROTATION

| FRAME BUFFER 4 ADDRESS (THREE LOW-ORDER BITS) | A | B | C | D | E | F | G | H |
|---|---|---|---|---|---|---|---|---|
| 7 | 1,7 | 2,7 | 3,7 | 4,7 | 5,7 | 6,7 | 7,7 | 0,7 |
| 6 | 2,6 | 3,6 | 4,6 | 5,6 | 6,6 | 7,6 | 0,6 | 1,6 |
| 5 | 3,5 | 4,5 | 5,5 | 6,5 | 7,5 | 0,5 | 1,5 | 2,5 |
| 4 | 4,4 | 5,4 | 6,4 | 7,4 | 0,4 | 1,4 | 2,4 | 3,4 |
| 3 | 5,3 | 6,3 | 7,3 | 0,3 | 1,3 | 2,3 | 3,3 | 4,3 |
| 2 | 6,2 | 7,2 | 0,2 | 1,2 | 2,2 | 3,2 | 4,2 | 5,2 |
| 1 | 7,1 | 0,1 | 1,1 | 2,1 | 3,1 | 4,1 | 5,1 | 6,1 |
| 0 | 0,0 | 1,0 | 2,0 | 3,0 | 4,0 | 5,0 | 6,0 | 7,0 |

FRAME BUFFER 4

X DIRECTIONAL WRITE (FIG. 19)

Y DIRECTIONAL WRITE (FIG. 20)

FIG. 19

MASK PATTERN AFTER ROTATION (325)

| FRAME BUFFER 4 ADDRESS ($A_0$ — $A_2$) (3LOW-ORDER BITS) | PERTINENT WORD | | | | | | | | ADJACENT WORD ON THE RIGHT IN X-AXIS DIRECTION | | | | | | | |
|---|---|---|---|---|---|---|---|---|---|---|---|---|---|---|---|---|
| | A | B | C | D | E | F | G | H | A | B | C | D | E | F | G | H |
| 7 | 1,7 | 2,7 | 3,7 | 4,7 | 5,7 | 6,7 | 7,7 | 0,7 | 9,7 | 10,7 | 11,7 | 12,7 | 13,7 | 14,7 | 15,7 | 8,7 |
| 6 | 2,6 | 3,6 | 4,6 | 5,6 | 6,6 | 7,6 | 0,6 | 1,6 | 10,6 | 11,6 | 12,6 | 13,6 | 14,6 | 15,6 | 8,6 | 9,6 |
| 5 | 3,5 | 4,5 | 5,5 | 6,5 | 7,5 | 0,5 | 1,5 | 2,5 | 11,5 | 12,5 | 13,5 | 14,5 | 15,5 | 8,5 | 9,5 | 10,5 |
| 4 | 4,4 | 5,4 | 6,4 | 7,4 | 0,4 | 1,4 | 2,4 | 3,4 | 12,4 | 13,4 | 14,4 | 15,4 | 8,4 | 9,4 | 10,4 | 11,4 |
| 3 | 5,3 | 6,3 | 7,3 | 0,3 | 1,3 | 2,3 | 3,3 | 4,3 | 13,3 | 14,3 | 15,3 | 8,3 | 9,3 | 10,3 | 11,3 | 12,3 |
| 2 | D3 6,2 | D4 7,2 | 0,2 | 1,2 | 2,2 | D0 3,2 | D1 4,2 | D2 5,2 | 14,2 | 15,2 | D5 8,2 | D6 9,2 | D7 10,2 | 11,2 | 12,2 | 13,2 |
| 1 | 7,1 | 1,0 | 1,1 | 2,1 | 3,1 | 4,1 | 5,1 | 6,1 | 15,1 | 8,1 | 9,1 | 10,1 | 11,1 | 12,1 | 13,1 | 14,1 |
| 0 | 0,0 | 1,0 | 2,0 | 3,0 | 4,0 | 5,0 | 6,0 | 7,0 | 8,0 | 9,0 | 10,0 | 11,0 | 12,0 | 13,0 | 14,0 | 15,0 |

FRAME BUFFER 4

FIG. 20

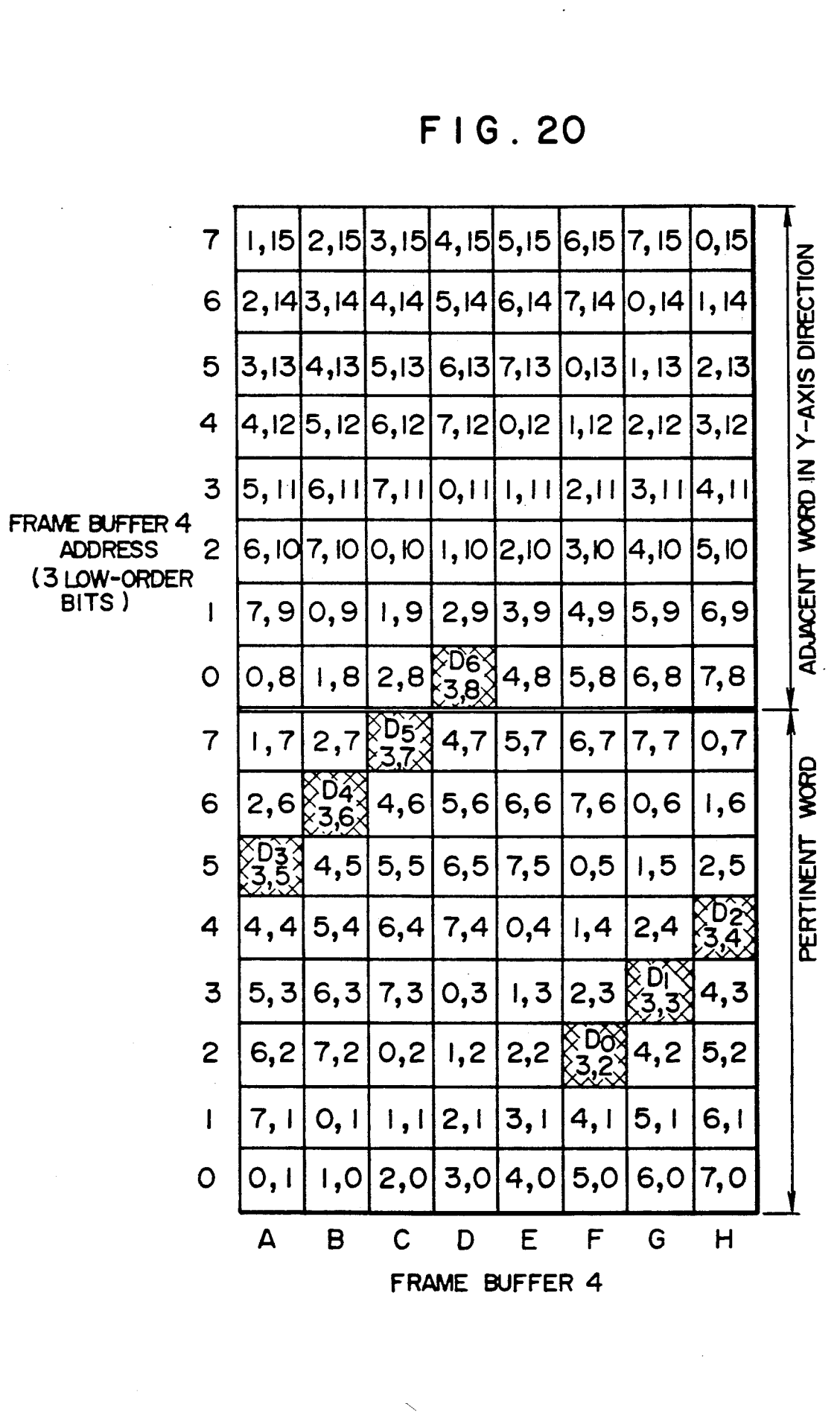

FRAME BUFFER 4 ADDRESS (3 LOW-ORDER BITS)

| | A | B | C | D | E | F | G | H | |
|---|---|---|---|---|---|---|---|---|---|
| 7 | 1,15 | 2,15 | 3,15 | 4,15 | 5,15 | 6,15 | 7,15 | 0,15 | ADJACENT WORD IN Y-AXIS DIRECTION |
| 6 | 2,14 | 3,14 | 4,14 | 5,14 | 6,14 | 7,14 | 0,14 | 1,14 | |
| 5 | 3,13 | 4,13 | 5,13 | 6,13 | 7,13 | 0,13 | 1,13 | 2,13 | |
| 4 | 4,12 | 5,12 | 6,12 | 7,12 | 0,12 | 1,12 | 2,12 | 3,12 | |
| 3 | 5,11 | 6,11 | 7,11 | 0,11 | 1,11 | 2,11 | 3,11 | 4,11 | |
| 2 | 6,10 | 7,10 | 0,10 | 1,10 | 2,10 | 3,10 | 4,10 | 5,10 | |
| 1 | 7,9 | 0,9 | 1,9 | 2,9 | 3,9 | 4,9 | 5,9 | 6,9 | |
| 0 | 0,8 | 1,8 | 2,8 | D6 3,8 | 4,8 | 5,8 | 6,8 | 7,8 | |
| 7 | 1,7 | 2,7 | D5 3,7 | 4,7 | 5,7 | 6,7 | 7,7 | 0,7 | PERTINENT WORD |
| 6 | 2,6 | D4 3,6 | 4,6 | 5,6 | 6,6 | 7,6 | 0,6 | 1,6 | |
| 5 | D3 3,5 | 4,5 | 5,5 | 6,5 | 7,5 | 0,5 | 1,5 | 2,5 | |
| 4 | 4,4 | 5,4 | 6,4 | 7,4 | 0,4 | 1,4 | 2,4 | D2 3,4 | |
| 3 | 5,3 | 6,3 | 7,3 | 0,3 | 1,3 | 2,3 | D1 3,3 | 4,3 | |
| 2 | 6,2 | 7,2 | 0,2 | 1,2 | 2,2 | D0 3,2 | 4,2 | 5,2 | |
| 1 | 7,1 | 0,1 | 1,1 | 2,1 | 3,1 | 4,1 | 5,1 | 6,1 | |
| 0 | 0,1 | 1,0 | 2,0 | 3,0 | 4,0 | 5,0 | 6,0 | 7,0 | |

FRAME BUFFER 4

CIRCUIT FOR AND METHOD OF CONTROLLING OUTPUT BUFFER MEMORY

CROSS-REFERENCE OF RELEVANT PATENT APPLICATIONS

The present application relates to U.S. patent application Ser. No. 750,781 entitled IMAGE DISPLAY APPARATUS filed on July 1, 1985 in the name of N. Asai et al, which has now issued as U.S. Pat. No. 4,757,312;

U.S. patent application Ser. No. 816,308 entitled IMAGE DISPLAY APPARATUS filed on Jan. 6, 1986 in the name of N. Asai et al, which has now issued as U.S. Pat. No. 4,779,223;

U.S. patent application Ser. No. 881,231 entitled GRAPHIC DISPLAY CONTROLLER on July 2, 1986 in the name of N. Asai;

U.S. patent application Ser. No. 031,676 entitled DISPLAY INFORMATION PROCESSING APPARATUS filed on Mar. 27, 1987 in the name of N. Asai et al, which has now issued as U.S. Pat. No. 4,924,432; and U.S. patent application Ser. No. 111,626 entitled RASTER OPERATION DEVICE filed on Oct. 23, 1987 in the name of Y. Kawamata, which has now issued as U.S. Pat. No. 4,868,553.

BACKGROUND OF THE INVENTION

The present invention relates to an output control circuit, more concretely, to an output control circuit using a bit map memory, and in particular, to an improvement of an output control circuit capable of effecting a high-speed processing of a dot pattern of a character in a frame buffer.

A memory control for achieving a raster display of output data on a computer graphic display has been described in the U.S. Pat. No. 4,197,590.

Heretofore, in character display apparatuses such as a computer system and a wordprocessor, often there has been adopted a code refresh method in which a location of each character is stored in a random access memory (RAM) so as to output a character pattern by use of a location in a character generator read-only memory (CGROM). Recently, a graphic display has been required in association with operations to display graphs and graphic images and the bit map refresh method is suitable for such graphic display. Incidentally, this also applies to the printer apparatus of a laser beam printer (LBP) for printing data in which characters, graphics, and image information are mixed.

According to the bit map refresh method, however, in the output or printing operation, the character output or print position supplied in the form of a logical address of X and Y coordinates must undergo an address conversion to attain a physical address of a frame buffer constituted with a bit map memory and moreover a bit shift processing must be effected to develop the dot patterns of characters in the frame buffer. As a result, when compared with the output method of the conventional code refresh method, the bit map refresh method has the disadvantage that the output processing speed is low. Incidentally, bit pattern shift processing is required in a case where a central processing unit (CPU) reads data from a character generator ROM (CGROM) storing the dot patterns of characters so as to write the data in a frame buffer. Namely, in general, the word boundary of the data stored in the CGROM does not match that of the frame buffer; consequently, when writing data in the frame buffer, the write data must be aligned with the word boundary of the frame buffer. This causes the output processing speed to be reduced. To overcome this difficulty, an article by M. Ishihara et al., entitled "256K Image Dual Port Memory Having Raster Operation Function and Serial Input Function"; Nikkei Electronics, Nikkei McGraw-Hill, Mar. 24, 1986, pp. 243-264 has proposed a method in which a high-speed development is accomplished with hardware.

Furthermore, conventionally, for the addresses and data of the frame buffer, the data of a memory device is assigned in one of the X-axis and Y-axis directions for X and Y coordinates as shown in FIG. 5 and the addresses of the memory device are assigned in the direction of the other axis. In this situation, when accessing a row of data in a direction of an axis, since n (eight in FIG. 5) memory devices correspond to the respective data terminals, the data can be simultaneously accessed. However, in a case of accessing a row of data in the direction of the other axis, since a memory device having a data terminal corresponds to n data items, the simultaneous access cannot be effected. Consequently, an operation to access the frame buffer is possible only in one direction. On the other hand, in a case where data is stored to be directed to a fixed direction with respect to the CGROM generating the dot patterns of characters, when the CPU reads data from the CGROM and writes the data in the frame buffer, the output character is directed in a predetermined direction. As a result, even when the character is desired to be directed in the horizontal or vertical direction, only the output character directed in the predetermined direction can be displayed at a high speed directly. For the higher speed, to meet the requirements above, the dot patterns of characters undergo a bit pattern conversion through software processing; however, the conversion processing cannot be achieved at a satisfactory high speed. To overcome this problem, the Japanese Patent Laid-Open No. 60-200285 (JP-A-60-200285) has proposed a method in which the bit pattern conversion is hardwarewise implemented in the form of a matrix so as to increase the speed of the bit layout conversion processing However, in a case where the bit shift processing of the character dot pattern is accomplished by means of a hardware system, when a character position supplied in the form of a logical address including X and Y coordinates is developed as a physical address of the frame buffer in the conventional method, since the address conversion is not supported by the hardware system, the address conversion processing must be achieved by a software processing, which increases the processing load imposed on the CPU. Moreover, in the case of bit shift processing where, for example, 7-bit source data is shifted by three bits so as to be eight bits, the bit width of the data actually written in the frame buffer is $$8 \text{ bits} - 3 \text{ bits} = 5 \text{ bits}$$

The two remaining bits not written in the write processing above undergo a write processing so as to be written in a word at an address adjacent to the preceding address word in the frame buffer. In the prior art technology, however, the software first checks to determine whether the write data bridges a word boundary of the frame buffer, and if this is the case, the remaining data not written is written at the subsequent address through software processing, which leads to a problem to be solved to effect the output processing at a higher speed.

In addition, when the processing to convert the bit layout of the character dot pattern is achieved in the prior art technology, a bit layout converter is required, and in the CPU processing in this case, the data read from the CGROM is first transferred to the bit layout converter and the transferred data is thereafter developed in the frame buffer, namely, as compared with a case where the data of the CGROM is directly developed in the frame buffer, there arises a problem that the processing speed is lowered.

SUMMARY OF THE INVENTION

It is therefore an object of the present invention to provide an output control circuit and an output control method in which, for a frame buffer of a computer, a work station, a wordprocessor, or a personal computer, with an arbitrary point associated with X and Y coordinates set as a reference point, consecutive points in the X axis as well as in the Y axis can be simultaneously accessed.

Another object of the present invention is to effect an operation in a case where output data sent to a frame buffer of a computer system bridges a pertinent data block and a data block adjacent thereto in which the data of the blocks undergo a read or write operation at a high speed with a matching established between the data.

Still another object of the present invention is to provide an improved output control circuit and an improved output control method in which a CGROM storing character data directed in a predetermined direction is used in such a way that, when writing a character in a frame buffer, a character write position can be indicated with a logical address including X and Y coordinates without considering a physical address or a boundary between address words in the frame buffer, thereby directly developing the character in the horizontal or vertical direction in the frame buffer.

The objects above can be accomplished by an output control circuit according to the present invention including a shifter for effecting a shift processing with respect to the bit correspondence between CPU data in which each word includes n bits and frame buffer data in which each word comprises n bits and for establishing a correspondence between the CPU data and an arbitrary bit position in a word of the frame buffer, a mask pattern generator for effecting a write/read mask on bits not to be accessed as a result of the shift processing, a write data synthesizer for synthesizing write data into the frame buffer based on the write mask pattern and the data which has undergone the shift processing, a read data synthesizer for synthesizing data to be read from the frame buffer based on the read mask pattern and read data in the frame buffer, a control signal generator for controlling operations, an address converter for subdividing a display area into square blocks each constituted with n bits by n bits, for accessing at one time data in a row direction of said square block in the frame buffer (n words) storing data so as to effect an address conversion, and for accessing at one time data in a column direction of said square block so as to effect an address conversion, a data rotator cooperative with said address converter for accessing at one time data in the row direction to effect a data rotate operation thereon and for accessing at one time data in the column direction to effect a data rotate operation thereon, an address generator for generating from a logical address, including X and Y coordinates indicating an output position, an address of a square block in the frame buffer and for generating an address of an adjacent block in the row or column direction, and a data write/read controller which, when the CPU accesses the frame buffer, specifies the row or column direction, effects a write control on data of said write synthesizer in a data write operation for words in the block generated by said address generator, said words determined by said address converter and said data rotator, and achieves a read control via said shifter on data from said read data synthesizer in a data read operation; furthermore, when data bridges the pertinent data block and a data block adjacent thereto, subsequently to the controls above, the output control circuit causes said address generator to generate an address of the adjacent block, effects similar controls on remaining data, writes the remaining data in a data write operation, and effects a matching of the read data between the pertinent block and the adjacent block so as to achieve a read control to attain consecutive data in a data read operation.

In the configuration described above, the address generator as a hardware item effects the processing conventionally accomplished by software, namely, the processing to develop a character output position supplied with a logical address including X and Y coordinates into a physical address of the frame buffer, which reduces the load imposed on the CPU. In addition, according to the present invention, when the data bridges the pertinent word and an adjacent word, the address of the adjacent word is also generated; consequently, during an access of the CPU, if the control means changes over the address for the frame buffer to effect two accesses, the CPU naturally need not take the word boundary into consideration at all, namely, the software to develop the CGROM data into the frame buffer can be simplified and the processing speed of the software is increased. Furthermore, according to the present invention, by combining the address convertor with the data rotator, data in the row direction and data in the column direction can be accessed at one time in the square block. That is, when implementing the bit layout conversion processing of the character dot pattern by use of a hardware system, the frame buffer access does not requires the operation, which has been required in the prior art technology, to pass through the bit layout converter; consequently, the software to develop the CGROM data into the frame buffer can be simplified and the processing speed of the software is increased.

In short, according to the present invention, the CPU can designate the character write position with a logical address represented by X and Y coordinates without taking the physical address of the frame buffer into consideration so as to directly develop the character in the horizontal (row) direction or in the vertical (column) direction in the frame buffer.

BRIEF DESCRIPTION OF THE DRAWINGS

The present invention will be apparent from the following detailed description taken in conjunction with the accompanying drawings in which:

FIG. 2 is a schematic block diagram showing the overall configuration of a wordprocessor display apparatus;

FIG. 3 is an internal configuration diagram showing an address generator indicated with a reference numeral 109 in FIG. 1;

FIG. 4 is a schematic diagram showing output values associated with input values in a conversion table indicated with a reference numeral 302 in FIG. 3;

FIG. 7 is a schematic diagram showing functions of an address converter indicated with a reference numeral 110 in FIG. 1;

FIG. 8 is a hardware configuration diagram of the address converter 110;

FIG. 9 is a hardware configuration diagram of a data rotate section indicated with a reference numeral 102 in FIG. 1;

FIG. 19 is a schematic diagram showing a data update in the frame buffer 4 through the operations like those of FIG. 17; and FIG. 20 is a schematic diagram showing a data update in the frame buffer 4 through the operations like those of FIG. 18.

DESCRIPTION OF THE PREFERRED EMBODIMENTS

Figure 1:
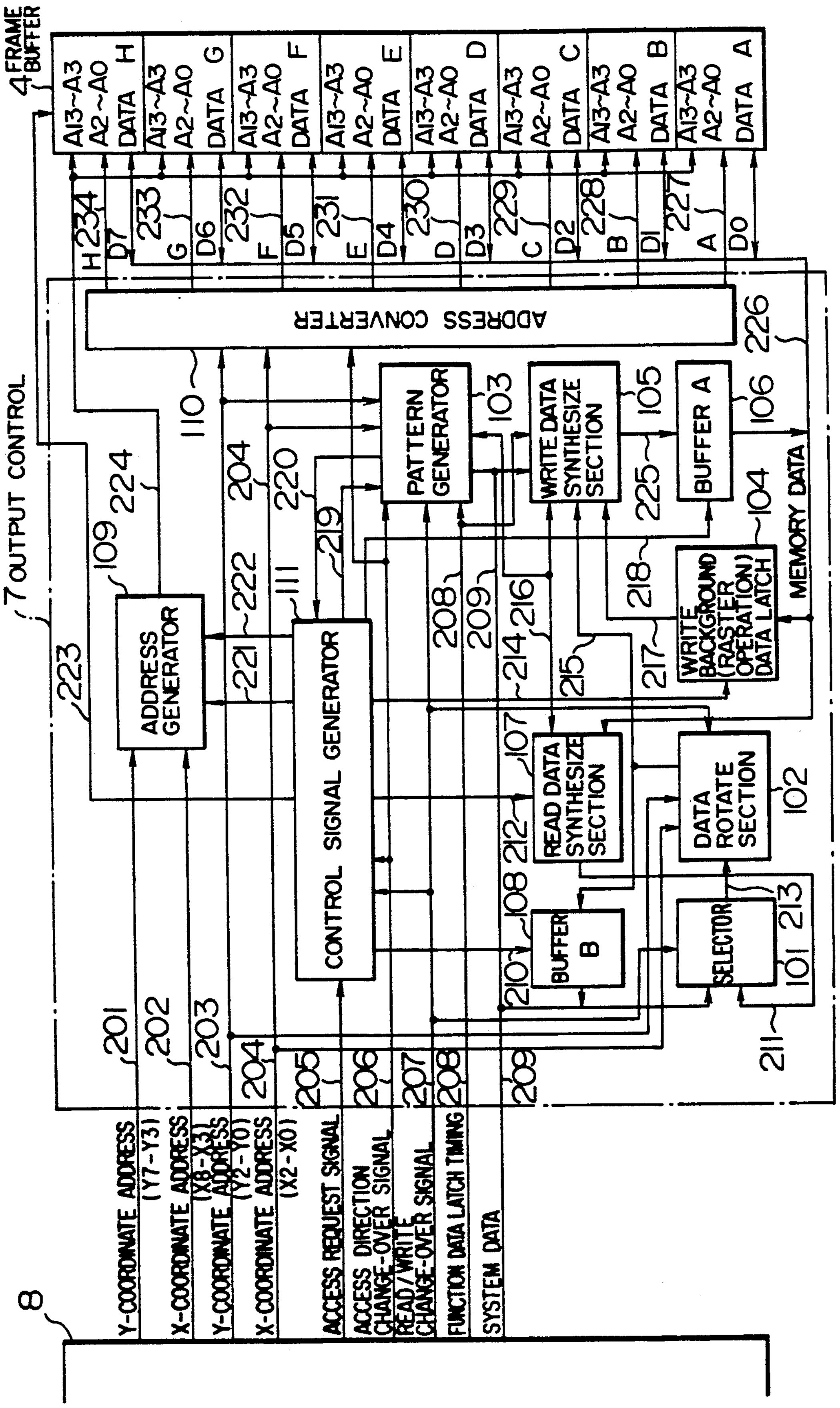
FIG. 1 is an internal configuration diagram of an output control circuit (indicated with a reference numeral 7 in FIG. 2) according to the present invention.

Referring now to the drawings, embodiments will be described according to the present invention.

First, a description will be given of the overall configuration of a wordprocessor display apparatus with reference to FIG. 2, which includes a CPU 1 operating in a unit of a word comprising eight bits to control the entire display apparatus, a program memory 2 for storing programs and data to be used for the operation of the display apparatus, a character generator ROM (CGROM) 3 for storing data of character patterns in which the characters are directed in a predetermined constant direction, a frame buffer 4 in which a bit map memory is constituted with eight memory devices, and a CRT 5 for displaying dots depending on dot data stored in the frame buffer 4. The configuration further includes a CRT controller 6 for generating addresses and synchronizing signals to read from the frame buffer 4 data to be displayed on the CRT 5, an output display control circuit 7 which enables a simultaneous access of eight consecutive points in the X-axis and Y-axis directions in the frame buffer 4 with an arbitrary coordinate point represented by X and Y coordinates set as a reference point, an access arbitrate circuit 8 for arbitrating an access between the CPU 1 and the CRT controller when the frame buffer 4 is accessed through the output control circuit 7, and an internal wiring route (bus) 9 for connecting the respective components.

Next, the internal constitution of the output control circuit (indicated with the reference numeral 7 in FIG. 2) will be described. In the system of FIG. 1, a selector 101 selects system data from line 209 in a write operation in response to a read/write change-over signal 207 and selects read synthesize data 211 from a read data synthesize section 107 in a read operation. A data rotate section 102 rotates selected data 213 from the selector 101 by a rotation amount represented by a value obtained as a result of an operation effected between X-coordinate address signal (X2-X0) and Y-coordinate address signal (Y2-Y0). A pattern generator 103 is a circuit which generates patterns in the write required area and write nonrequired area as well as the read required area and read nonrequired area in a word of the frame buffer 4. A write background data latch 104 latches read data from the frame buffer 4. A write data synthesize section 105 synthesizes write data to be written in the frame buffer 4 based on rotated data 215 from the data rotate section 102, write background data 217 from the write background data latch 104, and a pattern 216 from the pattern generator 103. A buffer-A 106 transfers write synthesize data 225 from the write data synthesize section 105 to a memory data line 226. A read data synthesize section 107 synthesizes read data to be sent to the CPU 1 or the CRT controller 6 based on memory data 226 from the frame buffer 4 and the pattern 216 from the pattern generator 103. A buffer-B 108 transfers data from a rotate data line 215 of the data rotate section 102 to a system data line 209. An address generator 109 generates a physical address associated with a memory address signal (A13-A3) of the frame memory 4 based on the X-coordinate address signal (X8-X3) 202 and the Y-coordinate address signal (Y7-Y3) 201. The address generator 109 can further generate a physical address of the word adjacent to the pertinent word. An address convert section 110 generates memory address signals (A2-A0) 227–234 based on information of the X-coordinate address signal (X2-X0) 204 and the Y-coordinate address signal (Y2-Y0) 203. A control signal generate section 111 controls the signals above and generates signals controlling the frame buffer 4. For a write operation, source data of the CPU 1 is written in a read-modify-write cycle into a write area of a word of the frame buffer 4. If the source data bridges the pertinent and adjacent words, the control is effected so as to write the remaining data in the adjacent word. On the other hand, in a read operation, data is read from a word of the frame buffer 4 in a read cycle. If the read data continues to an adjacent word, the remaining data is read from the adjacent word and the control is achieved such that the data thus read is combined so as to be outputted to the system data line 209.

Next, a description will be given of the respective components of the output display control circuit 7.

First, the internal configuration and the operation of the address generate section 109 of FIG. 1 will be described.

Figure 5:
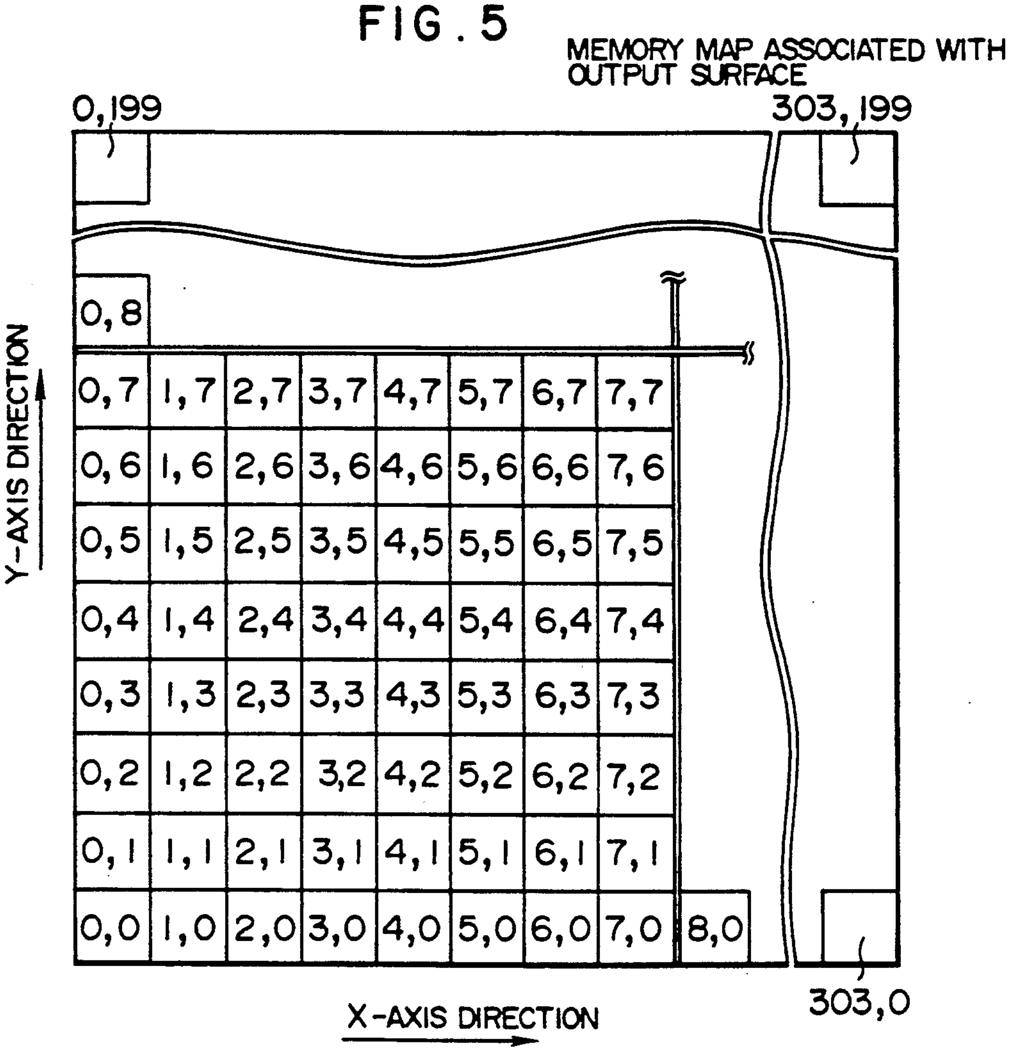
FIG. 5 is a screen layout diagram of a cathode ray tube (CRT indicated with a reference numeral 5 in FIG. 2) with 304 dots in the X-axis direction and 200 dots in the Y-axis direction.
Figure 6:
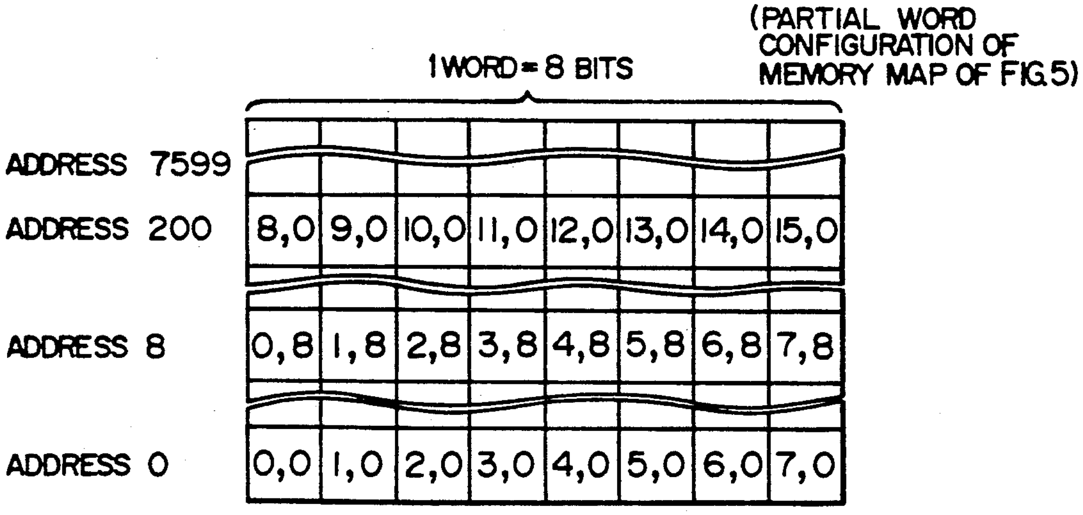
FIG. 6 is a schematic diagram showing physical addresses of a frame buffer indicated with a reference numeral 4 in FIG. 2.

FIG. 5 is a screen configuration diagram of a CRT (indicated with the reference numeral 5 in FIG. 2) with 304 dots in the X-axis direction and 200 dots in the Y-axis direction. With a square block constituted with 8 dots by 8 dots set as a unit, the CRT is respectively subdivided in the X-axis and Y-axis directions into 38 and 25 sections, respectively, so as to obtain a total of 950 blocks. The block in the lower-left corner of the screen is called the 0-th block, the block adjacent to the 0-th block in the Y-axis direction is called the 1st block, the block in the upper-left corner is referred to as the 24-th block, a block adjacent to the 0-th block in the X-axis direction is called the 25-th block, and the remaining blocks are numbered in a similar fashion so that the block in the upper-right corner is the 949-th block. Eight dots (bits) arranged in the X-axis direction of a block constitute a word, which is stored with a correspondence established with respect to a physical address of the frame buffer 4. According to the correspondence thus established above, consecutive blocks are formed in the frame buffer 4 in the Y-axis direction, as seen in FIG. 6, however, the adjacent blocks of the display in the X-axis direction take discrete values, namely, consecutive values are attained at an interval of 25 blocks. Consequently, in order to indicate the block numbers thereof with logical addresses represented by X and Y coordinates, it is only necessary that the value of the X-coordinate address of a bock (X8-X3) 202 is multiplied by 25 and that the resultant value is added to the value of the Y-coordinate address signal (Y7-Y3) 201 so as to be supplied to the addresses A3-A13 of the frame buffer 4. Next, as for the generation of the block number of an adjacent block, the block number of the adjacent block in the X-axis direction is attained by adding 25 to the pertinent current block number, whereas the block number of the adjacent block in the Y-axis direction is obtained by adding one to the current block number. A hardware system satisfying these conditions is implemented as the address generator 109 of which the internal configuration is shown in FIG. 3.

In FIG. 3, the adder section 301 adds one to the value of the X-coordinate address signal (X8-X3) 202 if the adjacent X-coordinate address generate signal 221 is valid. The conversion table 302 outputs the value attained by multiplying the input by 25 as shown in FIG. 4. More concretely, this table comprises a ROM having address input terminals associated at least six bits and data output terminals for at least ten bits. Furthermore, if the conversion table 302 is constituted with an RAM so as to enable the CPU 1 to change the output values therefrom, the operation can be effected also in the other areas in addition to the range defined by 304 dots in the X-axis direction and 200 dots in the Y-axis direction. The adder 303 adds the output value from the conversion table 302 to the value of the Y-coordinate address signal (Y7-Y3) 201. If the adjacent Y-axis address generate request signal 222 is valid, the adder 303 further adds one to the resultant value. The output value (the high-order address 224 of the memory) from the adder 303 is supplied to the addresses A3-A13 of the frame buffer 4.

Next, referring to FIG. 5, a description will be given of the internal constitution and the operation of the address convert section (indicated with the reference numeral 110 in FIG. 1).

Figures 15, 16:
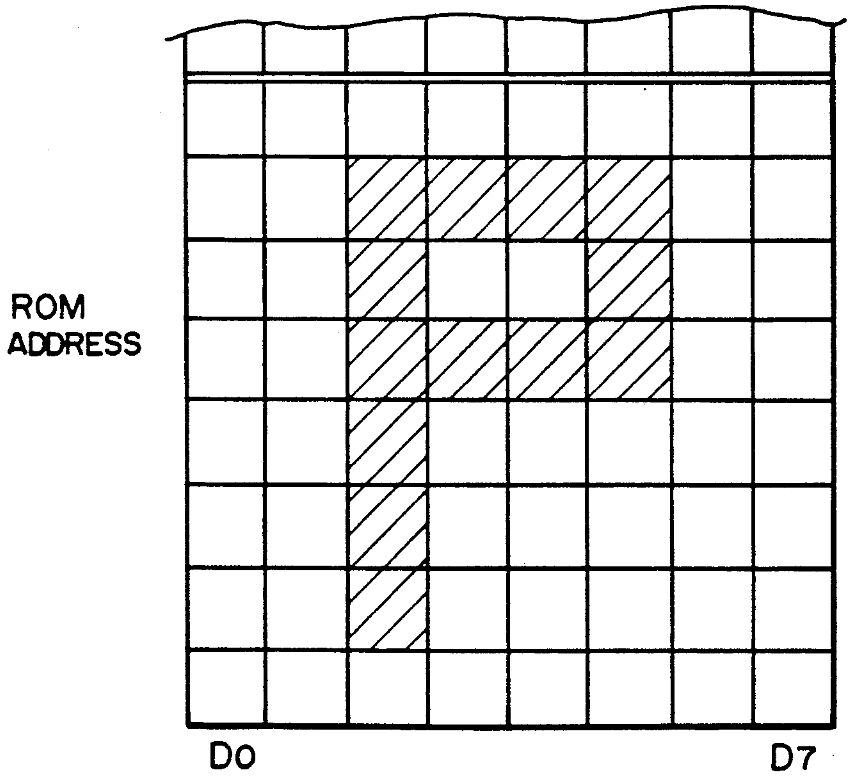
FIG. 15 is a schematic diagram showing allocation of addresses and data in the frame buffer indicated with a reference numeral 4 in FIG. 2.
FIG. 16 is a schematic diagram showing the data storage in a CGROM 3 (FIG. 2)

Assume here that, as shown in FIG. 5, the respective data terminals of the eight memory devices are assigned to the eight bits (0,0), (1,0), . . . , (7,0) in the X-axis direction and the address terminals of the memory device are respectively assigned to, for example, the data column represented as (0,0), (0,1), (0,2), . . . , (0,7) in the Y-axis direction. In this situation, when accessing the data row including (0,0), (1,0), . . . , (7,0) in the X-axis direction, since the respective data terminals of the eight memory devices correspond to the components of the data row, the simultaneous access of the data is possible. However, when accessing the data column, for example, including (0,0), (0,1), . . . , (0,7) in the Y-axis direction, since the eight data items correspond to the same memory device, the simultaneous access of the data is impossible, namely, eight accesses are necessary for this purpose. In order to enable the simultaneous access to be effected on the data column in the Y-axis direction, it is only required, as shown in FIG. 15, to achieve a rotation of the data to the right by a bit each time the Y-axis coordinate address is incremented by one so as to establish a correspondence with respect to the memory device. Based on the correspondence thus established, for data accesses in the X-axis and Y-axis directions, the eight bits to be subjected to the simultaneous access are not concentrated on the same memory device, that is, the eight bits are distributed to the respective memory devices such that each bit is distributed so as to be stored in the corresponding memory device, which enables the simultaneous data access to be accomplished. The address converter section 110 effects the address conversion and supplies the address to the memory address signal lines (A2-A0) of the respective memory device of the frame buffer 4. FIGS. 7 and 8 show the function and the hardware configuration thereof, respectively.

In FIG. 8 showing the hardware configuration of the address convert section 110, when the access direction change-over signal 206 indicates the X-axis direction, the selector 307 selects the Y-coordinate address signal (Y2-Y0) 203 and supplies the signal to the addresses 308-315, which in turn directly outputs the inputted value to the outputs A-H (indicated with reference numerals 227-234, respectively). When the access direction change-over signal 206 denotes the Y-axis direction, the selector 307 selects the reverse data of the X-coordinate address signal (X2-X0)

204 passed through the reverse circuit 306 and then supplies the reverse data to the addresses 308-315. The adder-A 308 adds one to the inputted value and delivers the resultant value to the output A; similarly, the adder-B 309 adds two thereto and supplies the resultant value to the output B, the adder-C 310 adds three thereto to attain the output C, the adder-D 311 adds four to obtain the output D, the adder-E 312 adds five to supply the output E, the adder-F 313 adds six to output the output F, the adder-G 314 adds seven to deliver the output G, and the adder-H 315 adds zero to attain the output H. The adders 308-315 each are 3-bit adders in which the carry to the fourth bit is ignored.

Referring next to FIG. 9, a description will be given of the internal constitution and the operation of the data rotate section 102 of FIG. 1.

First, a case of the write operation will be described. In order to achieve the simultaneous write operations in the X-axis and Y-axis directions, in addition to the address convert section 110, there is required a rotater which rotates the source data. The amount of rotation is specified by the value of the Y-coordinate address signal (Y2-Y0) 203 in a write operation in the X-axis direction so as to effect the rotation to the right; whereas in a write operation in the Y-axis direction, the value of the X-coordinate address signal (X2-X0) 204 is employed as the rotation amount to effect the rotation to the right. On the other hand, in order to effect a write operation with a reference point set to an arbitrary coordinate point represented with X and Y coordinates, there is required a bit shift processing to align the source data to the word boundary of the frame buffer 4. For a write operation in the X-axis direction, the X-coordinate address signal (X2-X0) 204 is set as the amount of rotation so as to achieve the rotation to the right; whereas for a write operation in the Y-axis direction, the Y-coordinate address signal (Y2-Y0) 203 is used as the rotation amount to accomplish the rotation to the right. These two rotation amounts of the source data are identical to each other in the write operations in the X-axis and Y-axis directions, namely, the amount of rotation is expressed by a value attained by adding the X-coordinate address signal (X2-X0) 204 to the Y-coordinate address signal (Y2-Y0) 203.

Next, a description will be given of a case of a read operation. The rotation amount of read data is equal to that employed in the case of the write operation; however, the direction of rotation is reversed, namely, the rotation must be effected to the left. Consequently, in the read operation, it is only necessary to achieve the rotation to the right with the rotation amount represented by a 2's complement of the value attained by adding the value of the X-coordinate address signal (X2-X0) 204 to the Y-coordinate address signal (Y2-Y0) 203. These data rotate operations are carried out by the data rotate section 102.

The arithmetic circuit 317 adds the value of the X-coordinate address signal (X2-X0) 204 to the Y-coordinate address signal (Y2-Y0) 203 so as to directly deliver the attained value if the read/write change-over signal 207 indicates a write operation and to output a 2's complement thereof if the signal 207 denotes a read operation. The rotater 318 effects a rotation to the right on the select data 213 from the selector 101 by the rotation amount indicated by the value thus obtained.

Figure 10:
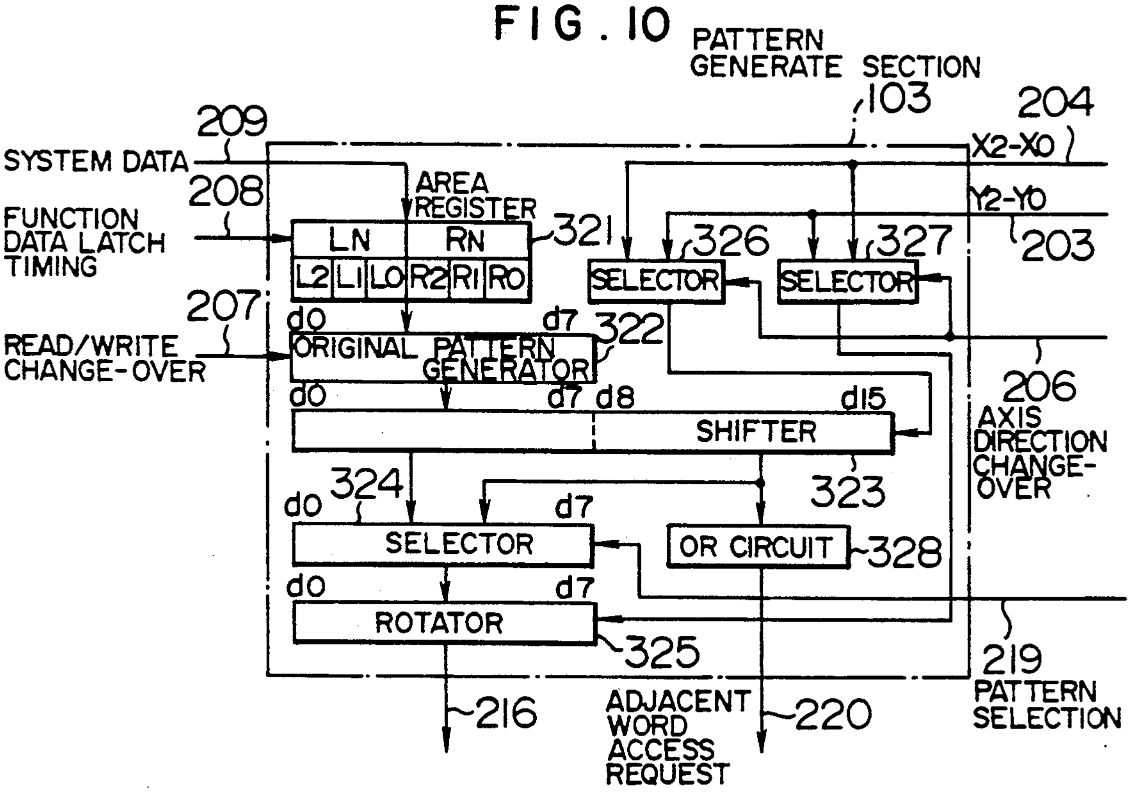
FIG. 10 is a hardware configuration diagram of a pattern generator 103 (FIG. 1)

Next, referring to FIG. 10, a description will be given of the internal configuration and the operation of the pattern generate section 103 of FIG. 1.

First, a case of a write operation will be described. In association with the bit shift processing above, there appear a write required field in which data is to be written and write nonrequired field in which data is not to be written in the word of the frame buffer 4. Data can be written in the write required field either by using a method in which only the write enable (WE) of the memory device corresponding to the write required field is regarded as valid or by using a method in which all pertinent data of the word of the frame buffer 4 is read out in the read-modify-write cycle such that the data thus read out is employed as the background data so that only the bits corresponding to the write required field are replaced with the source data, thereby writing the data. The latter method is advantageous in that the raster operations such as the AND and OR logic operations can be accomplished between the source data and the write background data. For this reason, this method is adopted in the embodiment. In FIG. 10 showing the configuration of the hardware of the pattern generate section 103 of FIG. 1, the CPU 1 preliminarily loads the field register 321 via the system data 209 with the left-most bit position LN and the right-most bit position RN of the write required field of the source data in response to the function data latch timing signal 208. The original pattern generator 322 generates an original pattern corresponding to the source data based on the LN and RN, namely, 0's are set for the bits of the write required field and 1's are set for the bits of the write nonrequired field. The original pattern is then shifted by the shifter 323 according to the shift amount for the bit shift processing, namely, the value supplied from the selector 326 of the X-coordinate address signal (X2-X0) 204 for a write operation in the X-axis direction and the value of the Y-coordinate address signal (Y2-Y0) 203 for a write operation in the Y-axis direction, which as a result generates an original pattern developed in 16 bits in which the bits other than those of the write required bits are set to 0. When the pattern select signal 219 indicates a pattern of the pertinent word, the selector 324 selects the pattern including d0-d7 of the shifter 323 and supplies the pattern to the rotater 325. When the pattern select signal 219 indicates the pattern of an adjacent word, the pattern including d8-d15 of the shifter 323 is selected and is then supplied to the rotater 325. The rotater 325 then effects the rotation of the data to the right according to the amount of rotation, which enables the respective simultaneous write operations in the X-axis and Y-axis directions, namely, the value supplied from the selector 327 of the Y-coordinate address signal (Y2-Y0) 203 for a write operation in the X-axis direction and the value of the X-coordinate address signal (X2-X0) for a write operation in the Y-axis direction. The OR circuit 328 generates, if the pattern including d8-d15 of the shifter 323 contains 1, an adjacent word access request signal 220 requesting an access to the adjacent word.

Next, a case of a read operation will be described. Although the shift amount of the shifter 323 and the rotation amount of the rotater 325 are the same, the original pattern generator 322 effects the read operation with all bits set to 1 regardless of the values of LN and RN when the read/write change-over signal 207 indicates a read operation.

Figure 11:
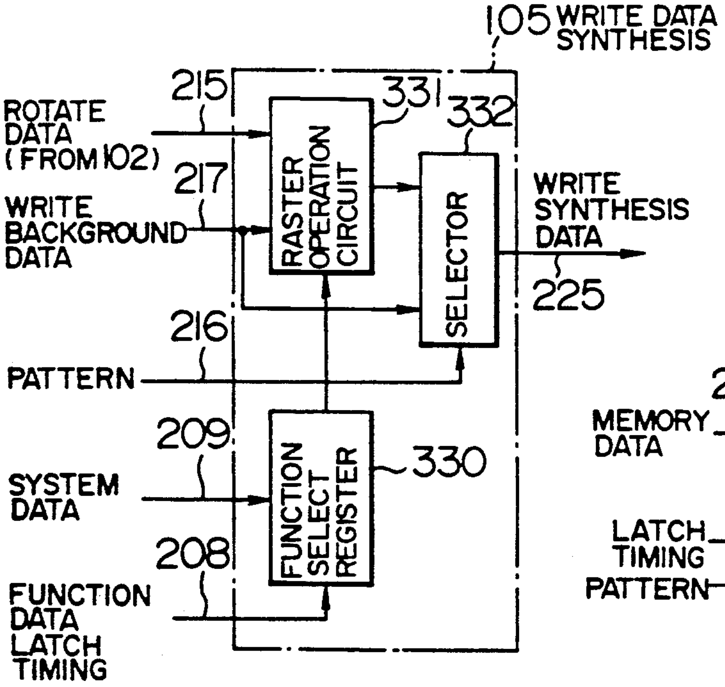
FIG. 11 is a circuit diagram for each bit showing a hardware configuration of a write data synthesize section 105 (FIG. 1)

Referring here to FIG. 11, a description will be given of the internal configuration and the operation of the write data synthesize section 105 of FIG. 1. The structure of FIG. 11 shows a circuit for each bit in the hardware configuration of the write data synthesize section 105.

In FIG. 11, the function select register 330 for selecting a kind of the raster operation is beforehand supplied via the system data line 209 by the CPU 1 with a kind of the raster operation in response to the function data latch timing signal 208. The raster operation circuit 331 achieves a raster operation between the rotate data 215 from the data rotate section 102 and the write background data 217 from the write background data latch 104. The selector 332 selects data outputted from the raster operation circuit 331 when the pattern 216 from the pattern generator 103 is 1. When the pattern 216 is 0, the write background data 217 is selected and is then outputted. This operation is accomplished on all bits.

Figure 12:
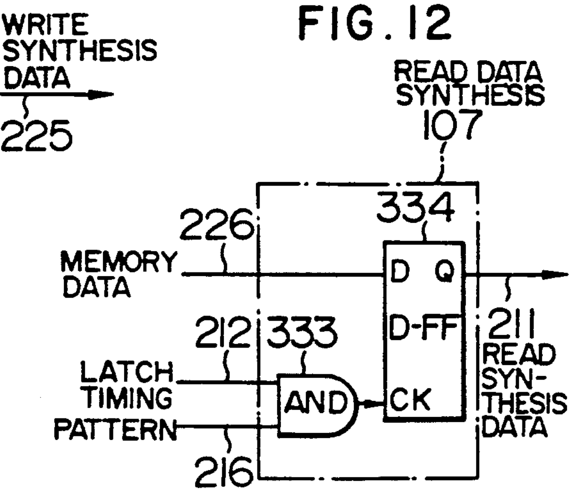
FIG. 12 is a circuit diagram for each bit showing a hardware configuration of a read data synthesize section 105 (FIG. 1)

Referring next to FIG. 12, a description will be given of the inner configuration and the operation of the read data synthesize section 107 of FIG. 1. The structure of FIG. 12 shows a circuit for each bit in the hardware configuration of the read data synthesize section 107.

In FIG. 12, the AND circuit 333 effects an AND logic operation between the read data latch timing signal 212 and the pattern 216 from the pattern generator 103 so as to generate a clock which latches only the bits of the read required field. The D-FF circuit 334 receives as a clock thereof the output from the AND circuit 333 so as to latch the memory data 226 read from the frame buffer 4. This operation is achieved on all bits. When the adjacent word access request signal 220 is invalid, the data is entirely attained through the access to the pertinent word; however, when the adjacent word access request signal 220 is valid, the adjacent word is also accessed and a data synthesize operation is then carried out to obtain the synthesis data. The read synthesis data 211 is delivered through the selector 101, the data rotate section 102, and the buffer B 108 so as to be supplied to the system data 209.

Figure 13:
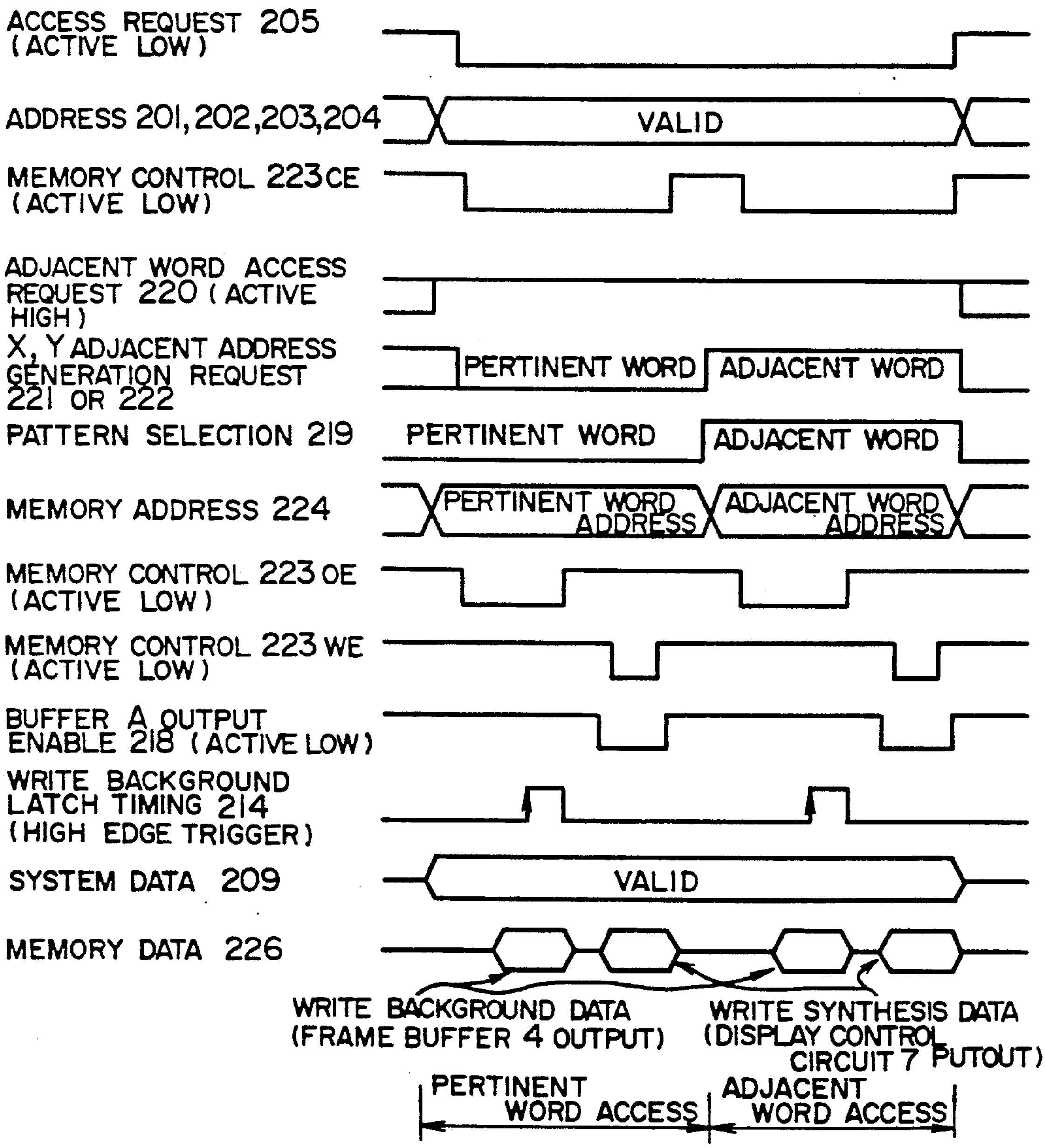
FIG. 13 is a schematic diagram showing the generation timing of control signals in a write operation in a control signal generate section 111 (FIG. 1)
Figure 14:
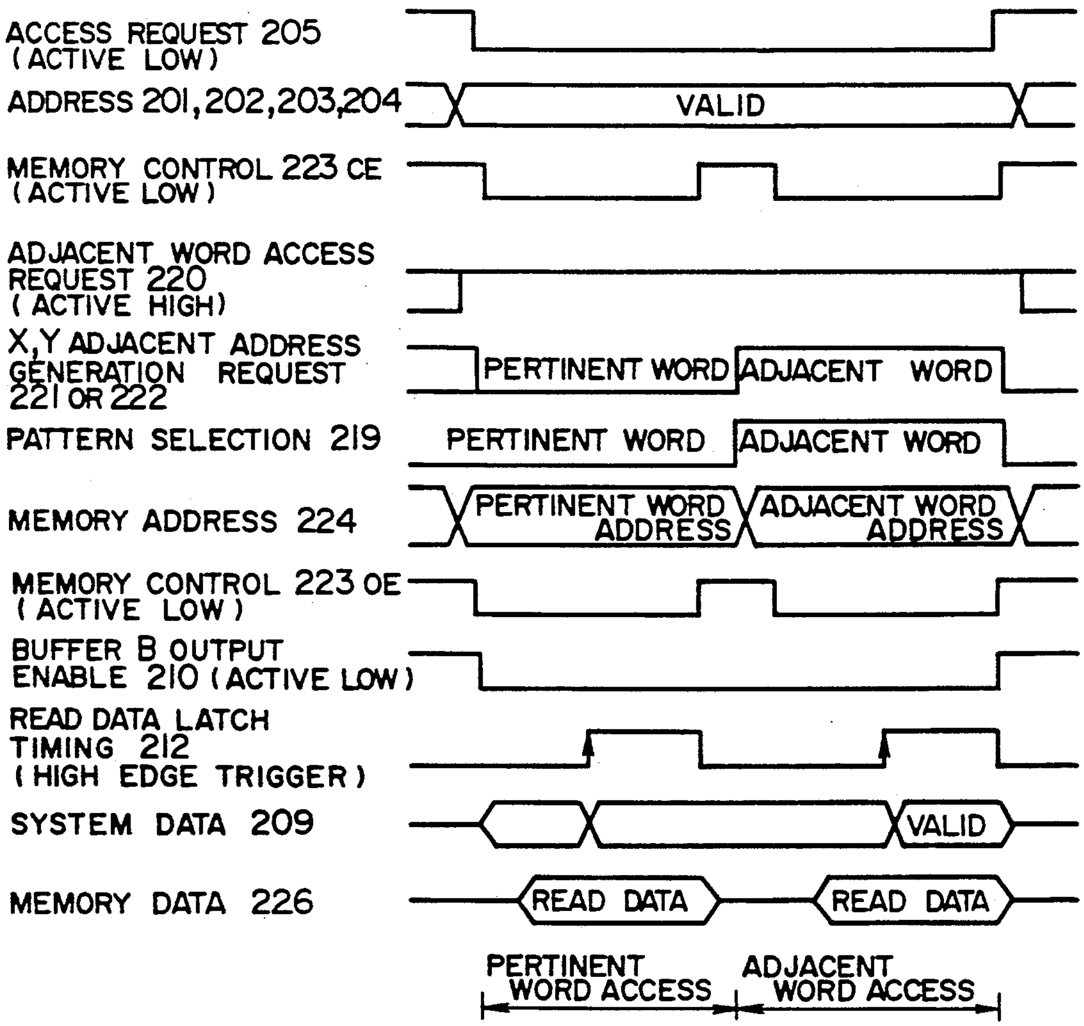
FIG. 14 is a schematic diagram showing the generation timing of control signals in a read operation in a control signal generate section 111.

In FIG. 1, the buffer A 106 outputs in response to the buffer A output enable signal 218 the write synthesis data 225 from the write data synthesize section 105 to the memory data line 226. In addition, the buffer B 108 outputs in response to the buffer B output enable signal 210 the rotate data 215 from the data rotate section 102 to the system data line 209. Furthermore, the write background data latch 104 latches in response to the write background data latch timing signal 214 the memory data 226 read from the frame buffer 4 in the read timing of the read-modify-write cycle. Moreover, the control signal generate section 111 receives as inputs thereto the access request signal 205, the access direction change-over signal 206, the read/write change-over signal 207, and the adjacent word access request signal 220 so as to produce the buffer B output enable signal 210, the read data latch timing signal 212, the write background data latch timing signal 214, the buffer A output enable signal 218, the pattern select signal 219, the X-axis adjacent address generation request signal 221, and the Y-axis adjacent address generation request signal 222. The control signal generate section 111 further produces the memory control signal 223 (the chip enable (CE), write enable (WE), and output enable (OE)) for the access sequence of the frame buffer 4. The timing to generate control signals in the write operation is as shown in FIG. 13, whereas the control signal generation timing in the read operation is as shown in FIG. 14. It is to be noted that when the adjacent word access request signal 220 is invalid (=0), only the pertinent word is accessed.

Figure 17:
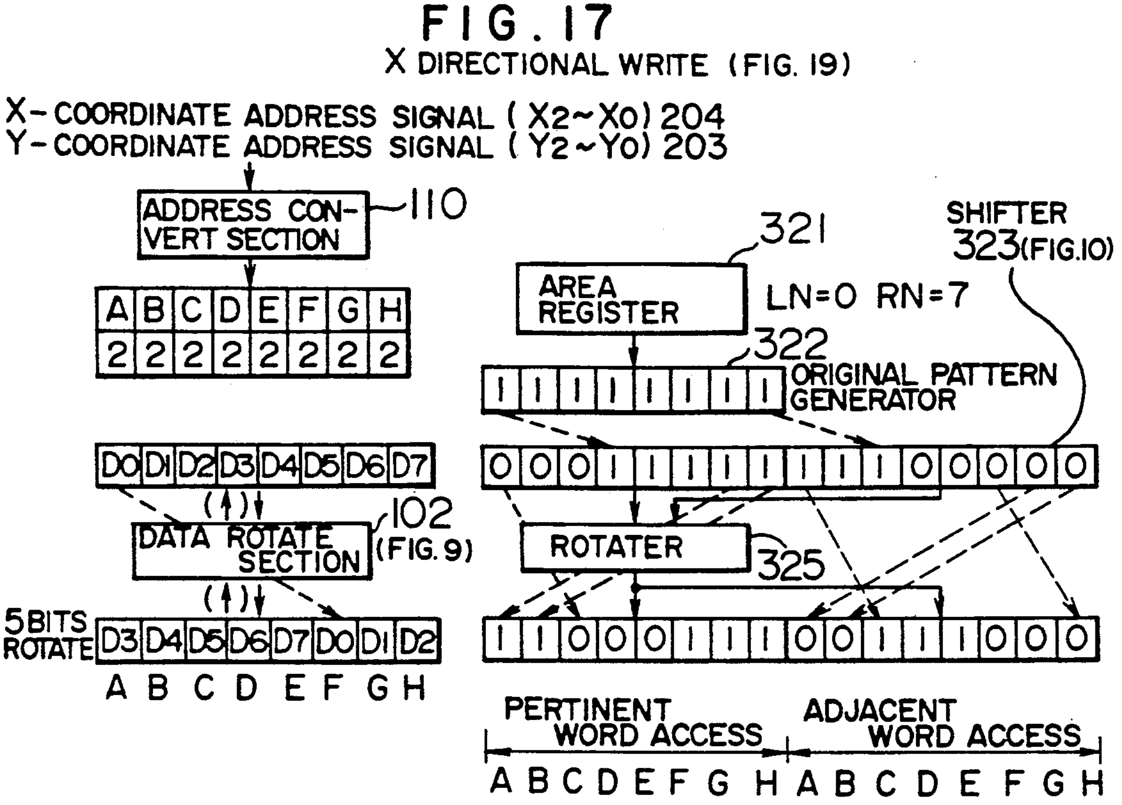
FIG. 17 is a diagram schematically showing an example of operations of the address converter 110, the data rotate section 102, and the pattern generator 103 of FIG. 1.

Next, the overall operation of the display control circuit according to the present invention will be described with reference to the following example in which all data of eight bits are written in the X-axis direction with the reference point set to a point represented by X and Y coordinates as (3,2). Operations associated with the processing above and to be effected by the address convert section 110, the data rotate section 102, and the pattern generate section 103 are shown in FIG. 17. First, in order to set LN=0 and RN=7 in the area of field register 321, the CPU 1 sends LN and RN information to the system data line 209 and sets the function latch timing signal 208 to be valid, thereby writing the LN and RN data in the area register 321. Next, the CPU 1 sets the access direction change-over signal to a state indicating an access in the X-axis direction, sets the read/write change-over signal to indicate a write operation, and sends the source data to the system data line 209 with the X-coordinate address (X8-X0)=(000000011) and the Y-coordinate address (Y7-Y0)=(00000010). The original pattern generator 322 is set such that all bits correspond to the write required field depending on the LN and RN. The shift amount of the shifter 323 is three shifts since the three low-order bits of the X-coordinate address is (X2-X0)=(011). The rotation amount of the rotater 325 is attained as two rotations since the three low-order bits of the Y-coordinate address is (Y2-Y0)=(010). On the other hand, the rotation amount of the data rotate section 102 is represented by a value attained by adding the three low-order bits of the X-coordinate address and the three low-order bits of the Y-coordinate address, and hence five rotations result. The write data synthesize section 105 synthesizes data (FIG. 11) based on the rotate data 215 from the data rotate section 102, the write background data 217 from the write background data latch 104, and the pattern 216 from the pattern generate section 103. On the other hand, the output from the address generate section 109 (FIG. 1) is 0, because, for the pertinent word access, the X-coordinate address signal (X8-X3) 202=(000000) and the Y-coordinate address signal (Y7-Y3)=(00000). For the adjacent word access, since the X-axis adjacent address generation request signal 221 is valid, the output from the address generate section 109 is 25, which is supplied as (00000011001) to the memory address signal (A13-A3) 224 of the frame buffer 4. As the output from the address convert section 110, a value of 2 (m=2), namely, (010) is respectively supplied to the memory address signals (A2-A0) 227-234 of the frame buffer 4 according to the functions of FIG. 7. When the write operation is accomplished with the data and the addresses, the locations ■ ■ of FIG. 19 are updated. Furthermore, when a read operation is achieved under the same conditions, the values associated with the address generate section 109, the address convert section 110, and the pattern generate section 103 are identical to those of the write operation, where only the data rotate section 102 effects an operation to rotate the data to the left.

Figure 18:
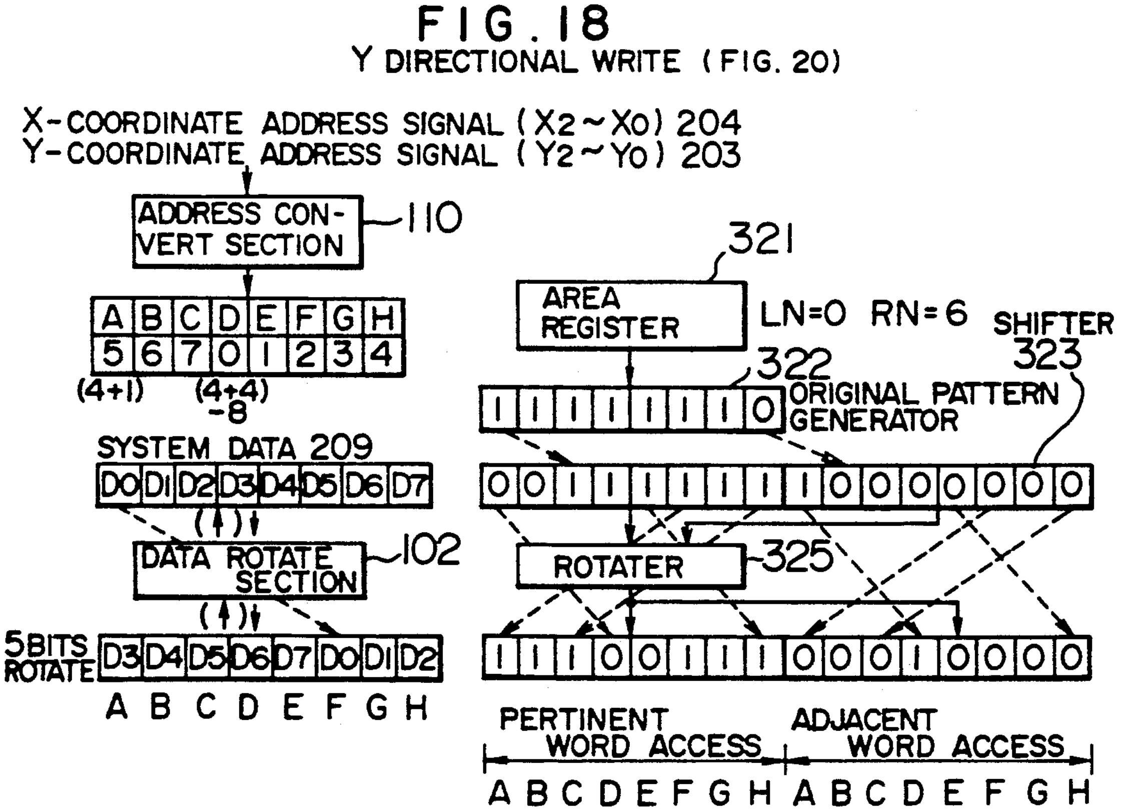
FIG. 18 is a diagram schematically showing another example of operations of the address converter 110, the data rotate section 102, and the pattern generator 103 of FIG. 1.

As another example, let us consider a case where LN=0 and RN=6 and data is written in the Y-axis direction with the reference point set to the coordinate point (3,2) in the X-Y coordinate system. FIG. 18 shows the operations of the address convert section 110, the data rotate section 102, and the pattern generate section 103. When a write operation is carried out according to the data and addresses of FIG. 18, the locations of ■ ■ of FIG. 20 are updated. The memory address signal (A2-A0) A227 of the address convert section 110 is supplied with 5, namely, (101); similarly, the memory address signal (A2-A0) B228 is supplied with 6, namely, (110); the memory address signal (A2-A0) C229 is supplied with 7, namely, (111); the memory address signal (A2-A0) D230 is supplied with 0, namely, (000); the memory address signal (A2-A0) E231 is supplied with 1, namely, (001); the memory address signal (A2-A0) F232 is supplied with 2, namely, (010); the memory address signal (A2-A0) G233 is supplied with 3, namely, (011); and the memory address signal (A2-A0) H234 is supplied with 4, namely, (100).

According to the present invention as described above, for the frame buffer 4 with 304 dots in the X-axis direction and 200 dots in the Y-axis direction, since eight consecutive points in the X-axis direction as well as eight consecutive points in the Y-axis direction can be simultaneously accessed, as shown in FIG. 16, when characters are written in the frame buffer 4 by use of the CGROM 3 storing characters to be directed to a predetermined direction, the character write position can be indicated with a logical address represented by X and Y coordinates without taking the physical address of the frame buffer 4 into consideration so as to directly develop the character in the horizontal or vertical direction in the frame buffer 4.

While the present invention has been described with reference to the particular illustrative embodiments, it is not restricted by those embodiments but only by the appended claims. It is to be appreciated that those skilled in the art can change and modify the embodiments without departing from the scope and spirit of the present invention.

I claim:

1. An output control circuit for controlling the reading and writing of data in a frame buffer which stores a plurality of square blocks of words, each word having n bits, in a one-to-one correspondence with a two dimensional output area having m blocks of n words arrayed in X and Y directions, said frame buffer being formed of n memory devices each storing m times n bits, said output control circuit comprising:

(a) word address generating means for generating an address for each bit of a word to be accessed in said frame buffer based on a lower bit portion of a X axis address and a lower bit portion of a Y axis address of a bit location of said two dimensional output area and a switching signal indicating the X or Y axis as an access direction;

(b) block address and adjacent block address generating means for generating an address of a block of said plurality of blocks based on an upper bit portion of said X axis address and an upper bit portion of said Y axis address and said switching signal and for generating an address of an adjacent block residing adjacent said block in said two dimensional output area in X or Y direction indicated by said switching signal;

(c) pattern generating means responsive to said lower bit portions of said X axis and Y axis addresses for generating a mask pattern to determine whether data is to be read from or written into a block or an adjacent block at locations based on a selected bit position identified by the lower bit portions of said X axis and Y axis addresses;

(d) access means for controlling said block address and adjacent block address generating means to access both a block and an adjacent block if accessed data bridges said adjacent block as determined by said pattern generating means;

(e) read data synthesize means for synthesizing read data based on said pattern generated by said pattern generating means, read data read out of said block and read data read out of said adjacent block, if read data bridges said adjacent block;

(f) write data synthesize means for synthesizing received write data based on said pattern generated by said pattern generating means and for writing the synthesized data into said block and an adjacent block if write data bridges said adjacent block; and (g) rotate means for rotating data to provide correspondence between received data and data of said block and said adjacent block by rotation of data based on said lower bit portion of an X axis address and said lower bit portion of a Y axis address of a bit location of said two dimensional output area to be accessed with said switching signal.

2. An output control circuit according to claim 1, wherein said block address and adjacent block address generating means includes an adder and a conversion table connected to said adder for generating an address of an adjacent bock adjacent to said block in a direction of the X or Y axis.

3. An output control circuit according to claim 1, wherein said word address generating means comprises:

address adding means for providing all of said n memory devices with a lower bit portion of said Y axis address as an address signal if said switching signal indicates the X axis as an access direction and, if said switching signal indicates the Y axis as an access direction, for providing respective n memory devices with a respective address signal obtained by adding a one's complement of said lower bit portion of said X axis address to a number equal to the sequential position of the memory device and wherein, if a resultant value thereof is larger than n, said resultant value is reduced by n.

4. An output control circuit according to claim 3, further comprising read/write means for providing an access mode signal indicative of a read or write operation, and wherein said rotate means includes a data rotator and rotation quantity indicating means responsive to an output of said read/write means for providing said data rotator with a value equal to said lower bit portion of said X axis address added to said lower bit portion of said Y axis address if said access mode indicates a write operation and for providing said said data rotator with a two's complement of said value as a quantity of said rotation by said rotate means if said access mode indicates a read operation.

5. An output control circuit according to claim 1, wherein said pattern generating means comprises:

an original pattern generator responsive to said switching signal indicating an X axes access direction for generating a predetermined original pattern of n bits; a shifter having a capacity of 2n bits for shifting said predetermined original pattern by an amount indicated by the lower bit portion of said X axes address; and a pattern rotator for rotating upper and lower n-bit portions of the contents of said shifter by an amount indicated by the lower bit portion of said Y axis address to generate said mask pattern.

6. An output control circuit according to claim 5, wherein said pattern generating means further comprises means responsive to the lower n-bit portion of the content of said shifter for providing a bridging signal indicating whether data to be read or written bridges over a block and an adjacent block, said block address and adjacent block address generating means being responsive to provision of said bridging signal for determining whether an address of an adjacent block is to be generated.

7. An output control circuit according to claim 1, wherein said pattern generating means includes:

an original pattern generator, responsive to said switching signal indicating a Y axis access direction and to a designation of a number of bits to be accessed, for generating a predetermined original pattern of n bits indicating the bits of the data to be accessed and the bits of the data to be not accessed; a shifter having a capacity of 2n bits for shifting said predetermined original pattern by an amount indicated by the lower bit portion of said X axis address; and a pattern rotator for rotating upper and lower n-bit portions of the contents of said shifter by an amount indicated by the lower bit portion of said X axis address to generate said mask pattern.

8. An output control circuit according to claim 7, wherein said pattern generating means further comprises means responsive to the lower n-bit portion of the content of said shifter for providing a bridging signal indicating whether data to be read or written bridges over a block and an adjacent block, said block address and adjacent block address generating means being responsive to provision of said bridging signal for determining whether an address of an adjacent block is to be generated.

* * * * *